(12) United States Patent
Yamamoto et al.

(10) Patent No.: US 9,729,324 B2
(45) Date of Patent: Aug. 8, 2017

(54) SEMICONDUCTOR INTEGRATED CIRCUIT, AUTHENTICATION SYSTEM, AND AUTHENTICATION METHOD

(71) Applicant: FUJITSU LIMITED, Kawasaki-shi, Kanagawa (JP)

(72) Inventors: Dai Yamamoto, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 94 days.

(21) Appl. No.: 14/593,057

(22) Filed: Jan. 9, 2015

(65) Prior Publication Data
US 2015/0207627 A1   Jul. 23, 2015

(30) Foreign Application Priority Data
Jan. 20, 2014 (JP) .................................. 2014-008088

(51) Int. Cl.
| | | |
|---|---|---|
| *H04L 29/06* | (2006.01) | |
| *H04L 9/32* | (2006.01) | |
| *H04L 9/08* | (2006.01) | |

(52) U.S. Cl.
CPC .............. *H04L 9/32* (2013.01); *H04L 9/0866* (2013.01); *H04L 9/3278* (2013.01)

(58) Field of Classification Search
CPC ........ H04L 9/32; H04L 9/0866; H04L 9/3278
USPC ........................................................ 713/168
See application file for complete search history.

(56) References Cited

U.S. PATENT DOCUMENTS

| | | | | |
|---|---|---|---|---|
| 5,148,112 A | * | 9/1992 | Gahan | H03K 5/22 327/19 |
| 8,415,969 B1 | * | 4/2013 | Ficke | H04L 9/3278 326/8 |
| 8,938,069 B2 | * | 1/2015 | Orshansky | H04L 9/3278 380/28 |
| 2002/0095575 A1 | * | 7/2002 | Paatero | G06Q 20/367 713/170 |

(Continued)

FOREIGN PATENT DOCUMENTS

| | | |
|---|---|---|
| JP | 2005-523481 | 8/2005 |
| JP | 2007-509563 | 4/2007 |

(Continued)

OTHER PUBLICATIONS

Chakraborty R S et al: "Harpoon: An Obfuscation-Based SoC Design Methodology for Hardware Protection", IEEE Transactions on Computer Aided Design of Integrated Circuits and Systems, IEEE Service Center, Piscataway, NJ, US, vol. 28, No. 10, Oct. 1, 2009 (Oct. 1, 2009), pp. 1493-1502, XP011276729, ISSN: 0278-0070, DOI: 10.1109/TCAD.2009.2028166.

(Continued)

*Primary Examiner* — Mahfuzur Rahman
(74) *Attorney, Agent, or Firm* — Fujitsu Patent Center

(57) ABSTRACT

A semiconductor integrated circuit includes a first circuit configured to provide a predetermined function and a second circuit configured to have a physically unclonable function, wherein the second circuit is incorporated into the first circuit such that a signal value of at least one node in the first circuit varies in response to an output of the second circuit, and the output of the second circuit is set such that the first circuit provides the predetermined function.

8 Claims, 13 Drawing Sheets

(56) References Cited

U.S. PATENT DOCUMENTS

| | | | |
|---|---|---|---|
| 2003/0204743 A1* | 10/2003 | Devadas | G06F 21/31 726/9 |
| 2007/0038871 A1 | 2/2007 | Kahlman et al. | |
| 2009/0055458 A1 | 2/2009 | O'Neil et al. | |
| 2009/0271860 A1* | 10/2009 | Nonaka | H04L 9/3278 726/16 |
| 2011/0199140 A1* | 8/2011 | Shimogawa | H03K 3/0375 327/208 |
| 2013/0010957 A1* | 1/2013 | Yu | H04L 9/0866 380/260 |
| 2013/0129083 A1* | 5/2013 | Fujino | G11C 7/24 380/29 |
| 2013/0322617 A1* | 12/2013 | Orshansky | H04L 9/3278 380/28 |
| 2014/0111234 A1* | 4/2014 | Laackmann | G01R 31/31719 324/750.3 |
| 2014/0201851 A1* | 7/2014 | Guo | H04L 9/0866 726/34 |
| 2014/0225639 A1* | 8/2014 | Guo | H03K 3/84 326/8 |
| 2015/0286914 A1* | 10/2015 | Kulikovska | G06K 19/0614 235/488 |

FOREIGN PATENT DOCUMENTS

| | | |
|---|---|---|
| JP | 2008-514975 | 5/2008 |
| WO | 03/090259 | 10/2003 |
| WO | 2005/041000 | 5/2005 |
| WO | 2006/033013 | 3/2006 |

OTHER PUBLICATIONS

Bhargava Mudit et al: "A High Reliability PUF Using Hot Carrier Injection Based Response Reinforcement", Aug. 20, 2013 (Aug. 20, 2013), Advances in Communication Networking : 20th EUNICE/IFIP EG 6.2, 6.6 International Workshop, Rennes, France, Sep. 1-5, 2014, Revised Selected Papers; [Lecture Notes in Computer Science , ISSN 1611-3349], Springer Verlag, DE, p. 90-106, XP047036755, ISSN: 0302-9743, ISBN: 978-3-319-21667-6.

James B Wendt et al: "Hardware Obfuscation using PUF-based Logic", Computer-Aided Design, IEEE Press, 445 Hoes Lane, PO Box 1331, Piscataway, NJ 08855-1331 USA, Nov. 3, 2014 (Nov. 3, 2014), pp. 270-277, XP058062268, ISBN: 978-1-4799-6277-8.

"Universal Mobile Telecommunications System (UMTS); LTE; 3G Security; Specification of the 3GPP confidentiality and integrity algorithms; Document 2: Kasumi specification (3GPP TS 35.202 version 11.0.0 Release 11)", Technical Specification, European Telecommunications Standards Institute (ETSI), 650, Route Des Lucioles ; F-06921 Sophia-Antipolis ; France, vol. 3GPP SA 3, No. V11.0.0, Nov. 1, 2012 (Nov. 1, 2012), XP014093300.

Edward Suh G et al: "Physical Unclonable Functions for Device Authentication and Secret Key Generation", 2007 44th ACM/IEEE Design Automation Conference : San Diego, CA, Jun. 4-8, 2007, IEEE, Piscataway, NJ, Jun. 1, 2007 (Jun. 1, 2007), pp. 9-14, XP031183294, ISBN: 978-1-59593-627-1.

EESR—Extended European Search Report dated Jul. 31, 2015 issued with respect to the corresponding European Patent Application No. 14200550.3.

* cited by examiner

SEMICONDUCTOR INTEGRATED CIRCUIT, AUTHENTICATION SYSTEM, AND AUTHENTICATION METHOD

CROSS-REFERENCE TO RELATED APPLICATIONS

The present application is based upon and claims the benefit of priority from the prior Japanese Patent Application No. 2014-008088 filed on Jan. 20, 2014, with the Japanese Patent Office, the entire contents of which are incorporated herein by reference.

FIELD

The disclosures herein relate to a semiconductor integrated circuit, an authentication system, and an authentication method.

BACKGROUND

In recent years, some products such as printer cartridges, batteries and game-machine cartridges have been provided with an authentication function to prevent clone products (i.e., counterfeit products) from being introduced. An authentication function may be implemented by use of confidential information (e.g., private key) that guarantees the genuineness of products. However, confidential information stored in the nonvolatile memory embedded in an IC chip may be at the risk of being stolen by a malignant user. Analysis of the internal structure of an IC chip embedded inside a genuine product by use of a microscope for performing minute inspection may successfully identify the values of confidential information stored in the nonvolatile memory.

A PUF (physically unclonable function) is an effective tool for implementing an authentication function in a secure manner without storing confidential information in a nonvolatile memory. Confidential information generated by a PUF cannot be identified even when analysis utilizing a microscope or the like is performed.

A PUF circuit is provided with a physically unclonable function, and generates a product-specific output value (hereinafter referred to as "product-specific information"). Some PUFs generate a specific output without taking an input, and other PUFs serve as a function that receives an input and generates an output responsive to the input. An ideal PUF circuit has the following characteristics. As a first characteristic, a PUF implemented in a given device invariably outputs the same produce-specific information (reproducibility). In the case of a PUF receiving an input, the PUF invariably output the same product-specific information in response to the same input. As a second characteristic, PUFs implemented in different devices output completely different product-specific information (uniqueness). In the case of PUFs receiving an input, the PUFs in different devices output different product-specific information in response to the same input.

In general, a PUF is configured such that the output thereof is determined in response to minute differences in the signal delay and device characteristics of a device attributable to variation between devices. This arrangement makes it possible to implement a PUF output that assumes a value that completely varies from device to device. In the case of such a PUF, a PUF implemented in a given device may produce an output value that varies depending on the operating voltage, operating temperature, or the like. That is, the reproducibility of a PUF output is not 100%. Some measures for error correction may thus be employed.

PUFs as described above may be utilized to implement an encryption function, thereby improving product security. One example is a smartcard. Further, confidentiality of communication is guaranteed by utilizing encryption functions in terminals for wireless Internet connection and in the SIM cards of portable phones. To this end, PUFs may be used in the part that generates an encryption key. Such an arrangement significantly reduces the risk of an encryption key being successfully analyzed by a malignant user, thereby improving security.

An authentication system that uses a PUF with an input and an authentication system that uses a PUF without an input have respective, different configurations and characteristics, and have respective advantages and disadvantages.

A PUF that generates a 1-bit output in response to an n-bit input will be described in the following as an example of a PUF with an input. In the case of such a PUF, there are $2^n$ different combinations of an input and an output. With this PUF, an authentication system will have the configuration as follows. A table is generated that lists $2^n$ pairs of an input and an output in respect of a PUF implemented in a given device (i.e., genuine chip), and is stored in advance in an authentication server. In order to check whether a device in question is a genuine product, the authentication server applies an input to the device in question, and checks whether the output value returned in response to the input is in agreement with the output value listed in the table stored in the server, thereby performing authentication. The input that is applied to a device in question is referred to as a "challenge", and the output of the device in question is referred to as a "response".

In the case of this procedure, the large size of the table stored in the server for authentication may give rise to a problem. A given product may be subjected to authentication 10000 times during the life cycle of this product. In such a case, a minimum of 10000 pairs of a challenge and a response need to be in existence in the server. Since the values listed in the table differ from PUF to PUF (i.e., differ for each chip in question), tables as many as the number of sold chips need to be stored in the authentication server. As a result, the total size of tables stored in the authentication server becomes enormous, resulting in an increase in the time required for authentication. Further, the reproducibility of a PUF may not be 100%. In such a case, the server may be provided in advance with a mechanism for correcting an error, which results in an cost increase.

In the case of using a PUF without an input, there is supposed to be only one invariable output pattern. In consideration of this, a system that enables the provision of an authentication system by combining an encryption function with the output of a PUF serving as a key may be used. To be more specific, a plurality of output bits generated by a PUF embedded in a given device are stored in a register within the device. The data stored in the register is to be used as a key input into an encryption function. An authentication server has the key and the encryption function registered therein. In order to check whether a device in question is a genuine product, the authentication server supplies a plaintext input serving as a challenge to the encryption function of the device in question, which then produces an encrypted text as a response. This response is matched against the output that is internally generated in the authentication server by using the key and the encryption function in the authentication server, thereby performing authentication. In the case of reproducibility being not 100%, the output of the PUF may contain error. Error correction code or the like may be used to correct the data, which is then registered in the register.

The use of the above-noted configuration does not require a large size table in an authentication server, thereby offering a high degree of convenience. Such an authentication system, however, may have a low level of anti-counterfeiting security. One possible attack point may be the correction data that is used to correct error in the output of the PUF. The correction data is supposed to be stored in a nonvolatile memory. A malignant user may thus be able to read the correction data by reverse engineering. As a result, there is a risk of the key being compromised based on the correction data. Another possible attack point may be the register that stores the key. A malignant user may use a side-channel attack or the like to identify the key stored in the register. When this happens, the security of the authentication system is totally compromised.

Among the related-art configurations as described above, the authentication system that uses table data and a PUF with an input requires a large amount of data to be stored in the authentication server, which poses a problem in practical application. The authentication system that uses an encryption function and a key provided by a PUF without an input has a low level of security against an attack. It may be noted that the objective is to prevent a counterfeit product from being manufactured. Ultimately, therefore, achieving this objective is what is desired regardless of the presence or absence of an authentication system. Accordingly, it may be desirable to provide a semiconductor integrated circuit that utilizes a PUF to effectively and efficiently prevent a counterfeit product from being manufactured.

[Patent Document 1] Japanese National Publication of International Patent Application No. 2005-523481

[Patent Document 2] Japanese National Publication of International Patent Application No. 2007-509563

[Patent Document 3] Japanese National Publication of International Patent Application No. 2008-514975

SUMMARY

According to an aspect of the embodiment, a semiconductor integrated circuit includes a first circuit configured to provide a predetermined function and a second circuit configured to have a physically unclonable function, wherein the second circuit is incorporated into the first circuit such that a signal value of at least one node in the first circuit varies in response to an output of the second circuit, and the output of the second circuit is set such that the first circuit provides the predetermined function.

According to an aspect of the embodiment, an authentication system includes a server having a transformation function stored therein to transform first data to second data, and a semiconductor integrated circuit configured to communicate with the server, wherein the semiconductor integrated circuit includes a first circuit configured to realize the transformation function, and a second circuit configured to have a physically unclonable function, wherein the second circuit is incorporated into the first circuit such that a signal value of at least one node in the first circuit varies in response to an output of the second circuit, and the output of the second circuit is set such that the first circuit provides the transformation function.

According to an aspect of the embodiment, a method for authentication includes supplying an input into a circuit that has a physically unclonable function incorporated therein and that realizes a predetermined transformation function, receiving a first output generated by the circuit in response to the input, supplying the input to the transformation function provided separately from the circuit to cause the transformation function to produce a second output, and comparing the first output with the second output.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments of the invention will be described with reference to the accompanying drawings.

Figure 1B:
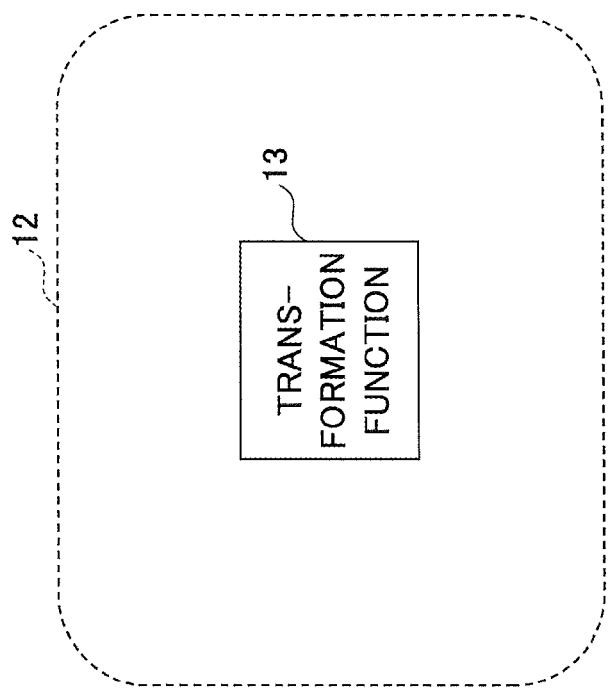
FIGS. 1A and 1B are drawings illustrating an example of the configuration of a semiconductor integrated circuit and an authentication system that can prevent the manufacturing of a counterfeit product.
Figure 1A:
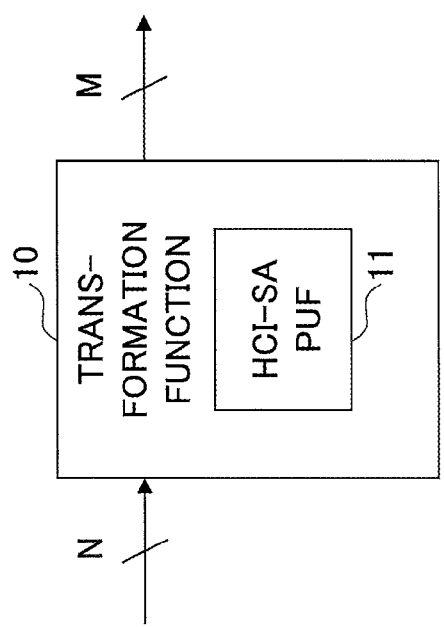

FIGS. 1A and 1B are drawings illustrating an example of the configuration of a semiconductor integrated circuit and an authentication system that can prevent the manufacturing of a counterfeit product. A semiconductor integrated circuit 10 illustrated in FIG. 1A generates an M-bit output in response to an N-bit input. N is an integer greater than or equal to 2, and M is an integer greater than or equal to 1. The relationship between the input and the output of the semiconductor integrated circuit 10 serves to enable the realization of a predetermined function. Namely, the predetermined function generates one or M output bits in response to N input bits. This predetermined function may enable the provision of the input-and-output relationship of a certain transformation function, for example.

The semiconductor integrated circuit 10 has at least one PUF circuit 11 embedded therein. More specifically, the PUF circuit 11 is embedded in the semiconductor integrated circuit 10 such that at least one node in the semiconductor integrated circuit 10 has a signal value varying in response to the output of the PUF circuit 11. The output of the PUF circuit 11 is set such that the semiconductor integrated circuit 10 provides the above-noted predetermined function.

The PUF circuit 11 used in this configuration is supposed to have 100% reproducibility. An example of such a PUF is a HCI-SA-PUF. HCI-SA-PUF is an improvement of a SA-PUF (i.e., sense-amplifier-PUF). A sense amplifier is a circuit that is typically used to amplify voltage from a memory cell, and serves to check the magnitude relationship between two inputs A and B. In the case of B being smaller than A, the output assumes "0", for example. In the case of B being greater than A, the output assumes "1". When the two inputs A and B applied to the sense amplifier are practically equal to each other, the output of the sense amplifier is set to "0" or "1" in response to a minute difference in the threshold and the like between individual transistor devices. Such an output value is dependent on the device-to-device variation of transistor thresholds and the like, and, thus, is expected to have reproducibility and uniqueness.

In reality, however, the output of an SA-PUF tends to depend on the voltage level, temperature, and the like, resulting in reproducibility being not 100%. Further, there is a problem in that the designer cannot control the output value.

In the case of an HCI-SA-PUF, the utilization of hot carrier injection (HCI) at the time of implementing a sense amplifier in an LSI chip makes it possible to raise the threshold voltage of a transistor device, thereby controlling the output value of the sense amplifier. Namely, the physical characteristics of the circuit can be controlled by use of HCI such that the output of the sense amplifier is set equal to either "0" or "1". Further, the utilization of HCI enables a sufficient difference in the threshold value to occur between transistor devices, thereby making it possible to provide 100% reproducibility.

In FIG. 1A, the PUF circuit 11 may include a transistor device whose threshold value is set by hot carrier injection, thereby achieving 100% reproducibility. To be more specific, the PUF circuit 11 may be an HCI-SA-PUF.

The transformation from a plurality of inputs into one or more outputs that is implemented by the semiconductor integrated circuit 10 may be defined by a predetermined algorithm. The output of the PUF circuit 11 may be set such that this predetermined algorithm is realized. The transformation from a plurality of inputs into one or more outputs that is implemented by the semiconductor integrated circuit 10 may be an encryption function. The output of the PUF circuit 11 may be set such that this encryption function is realized. In the case of the semiconductor integrated circuit 10 being an authentication circuit embedded in a device to be authenticated by an authentication system, the server of the authentication system may have the above-noted predetermined algorithm or encryption function stored therein. Namely, in an authentication server 12 illustrated in FIG. 1B, a transformation function 13 that enables the provision of the predetermined algorithm or encryption function may be stored in a memory device such as a hard disk drive.

In order to check whether a device in question is a genuine product, the authentication server 12 supplies a challenge as an input into the semiconductor integrated circuit 10 of the device in question, and receives the response generated by the semiconductor integrated circuit 10. The authentication server 12 checks whether the received response is in agreement with an output that is internally generated by inputting the same value as the above-noted challenge into the internal transformation function 13. In the case of the response being in agreement with the internally generated output, the authentication result indicates that the device in question is a genuine product. In the case of the response being not in agreement with the internally generated output, the device in question is rejected as being not a genuine product. The transformation function of the semiconductor integrated circuit 10 may not be an encryption function per se, but may be a nonlinear transformation circuit for encryption.

In the semiconductor integrated circuit and the authentication system illustrated in FIGS. 1A and 1B as described above, the authentication server 12 has only the transformation function 13 stored therein. The authentication system illustrated in FIGS. 1A and 1B thus offers a high degree of convenience as compared with the related-art configuration in which the authentication server has a large size table stored therein. Further, the authentication system illustrated in FIGS. 1A and 1B also offers a high degree of convenience as compared with the related-art configuration in which the authentication server has an encryption function and device-specific keys stored therein. Moreover, the authentication system illustrated in FIGS. 1A and 1B has a PUF embedded in the semiconductor integrated circuit, which offers a high level of anti-counterfeiting security as compared with the related-art configuration in which correction data and keys are stored in a nonvolatile memory or register. Namely, the authentication system illustrated in FIGS. 1A and 1B do not have a weak point as in the related-art configurations.

Figure 2:
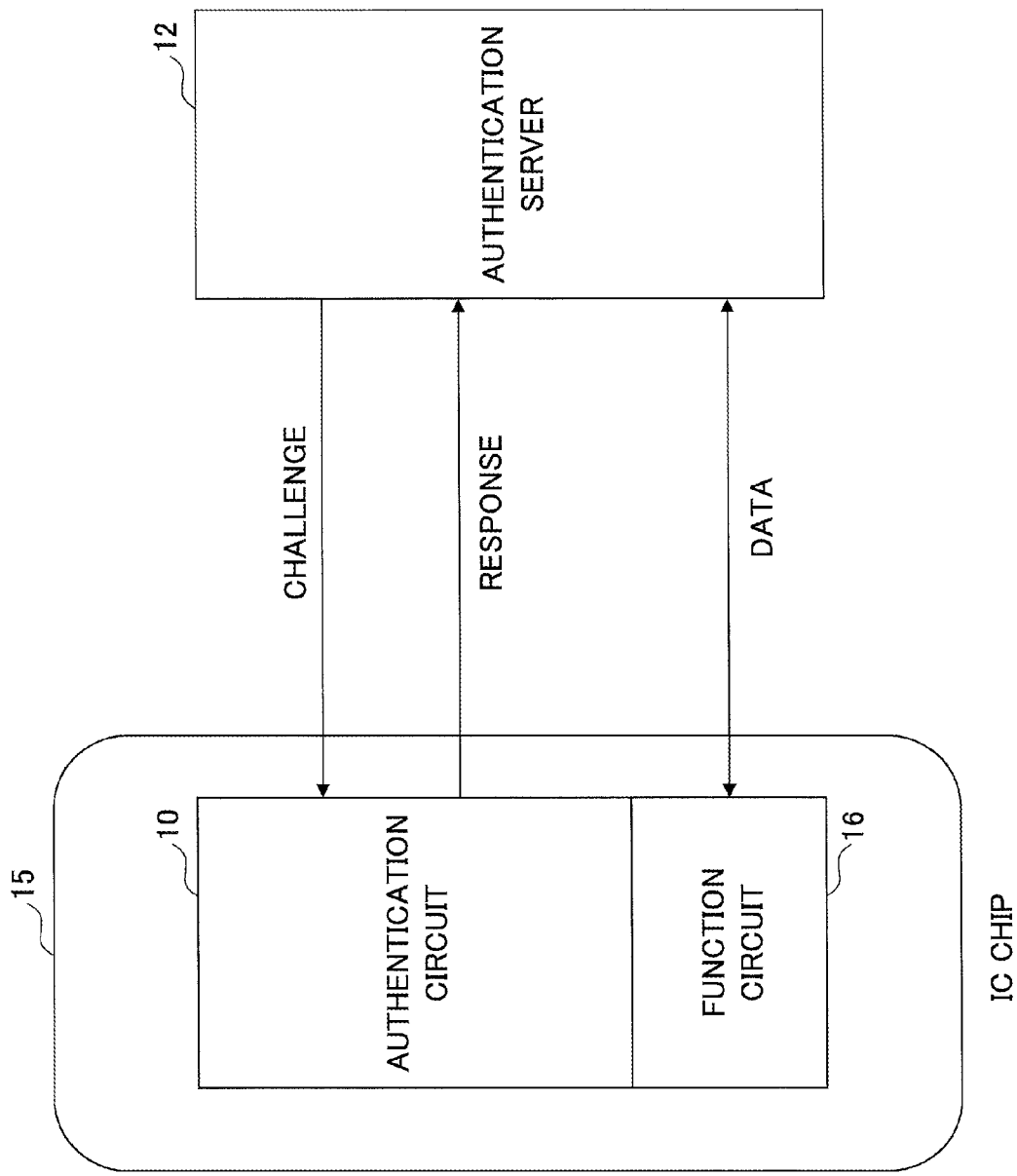
FIG. 2 is a drawing illustrating an example of the configuration of the authentication system.

FIG. 2 is a drawing illustrating an example of the configuration of an authentication system. A device 15 to be authenticated is capable of communicating with the authentication server 12 through radio or the like. The device 15 includes an authentication circuit 10 corresponding to the semiconductor integrated circuit 10 illustrated in FIGS. 1A and 1B, and also includes a function circuit 16. The function circuit 16 serves to provide the functionality that is the main reason for a user to use the device 15. In the case of the device 15 being a portable phone, for example, the function circuit 16 serves to provide portable phone functionality.

The authentication server 12 gives a challenge to the semiconductor integrated circuit 10 to receive a response as previously described, thereby checking the genuineness of the device 15 having the authentication circuit 10 embedded therein. In the case of the device 15 being found to be a genuine product as a result of authentication, the function circuit 16 of the device 15 is allowed to perform a desired operation based upon permission given from the authentication server 12. In the case of the device 15 being found to be not a genuine product as a result of authentication, the function circuit 16 of the device 15 is not allowed to perform a desired operation upon being rejected by the authentication server 12.

It may be noted that a PUF circuit may be incorporated into the function circuit 16 to improve anti-counterfeiting security. Namely, the PUF circuit 16 may be embedded in the function circuit 16 such that at least one node in the function circuit 16 has a signal value varying in response to the output of the PUF circuit. The output of the PUF circuit may then be set such that the function circuit 16 provides the above-noted predetermined functionality.

Figure 3:
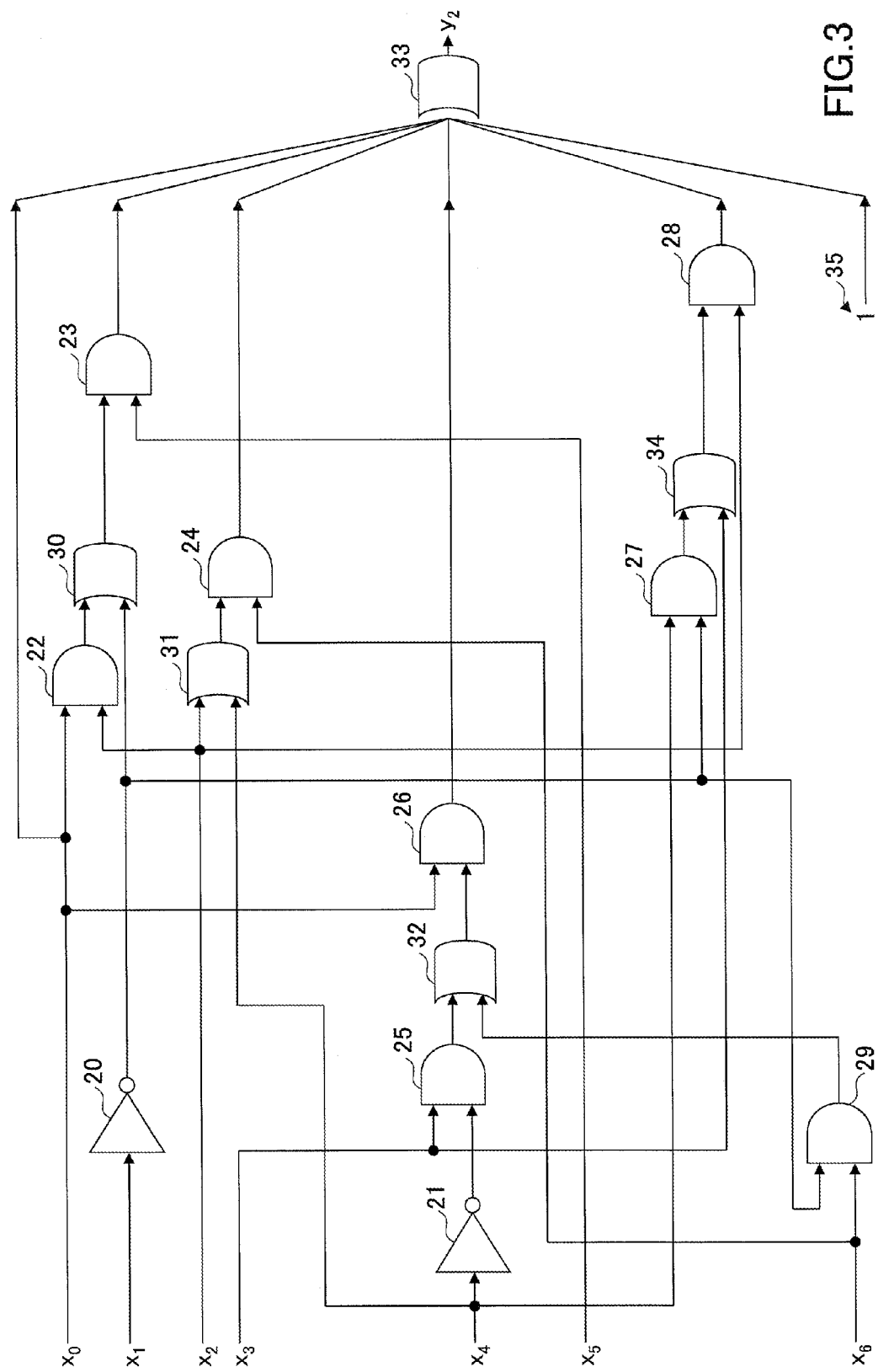
FIG. 3 is a drawing illustrating an example of part of the configuration of the semiconductor integrated circuit.

FIG. 3 is a drawing illustrating an example of part of the configuration of the semiconductor integrated circuit 10. The circuit illustrated in FIG. 3 is designed to output the second bit of nonlinear transformation function S7 in KASUMI encryption. In the case of the transformation function of the semiconductor integrated circuit 10 being a KASUMI encryption function, the circuit illustrated in FIG. 3 constitutes a portion of the semiconductor integrated circuit 10.

The use of the publicly known transformation function such as S7 may be associated with a risk of the transformation function being identified to be S7 by reverse engineering, which leads to the consequence that the malignant user successfully learns the algorithm of the transformation function. In consideration of this, it is preferable for the transformation function used in the semiconductor integrated circuit 10 to be an encryption function or the like that is independently developed and that is thus not publicly known. For the sake of convenience, however, publicly known S7 will be used as an example in the following.

Nonlinear transformation function S7 illustrated in FIG. 3 outputs one bit $y_2$ in response to 7 input bits $X_0$ through $X_6$. The nonlinear transformation circuit for implementing this function includes inverters 20 and 21, AND gates 22 through 29, OR gates 30 through 34, and a constant inputting circuit 35 as illustrated in FIG. 3. As will be described in the following, a PUF circuit may be embedded in the nonlinear transformation circuit such that at least one node in the nonlinear transformation circuit has a signal value varying in response to the output of the PUF circuit. In such a configuration, the output of the PUF circuit is set such that the nonlinear transformation circuit provides the predetermined functionality (i.e., the functionality that enables the realization of the input-and-output relationship of transformation function S7).

Figure 4:
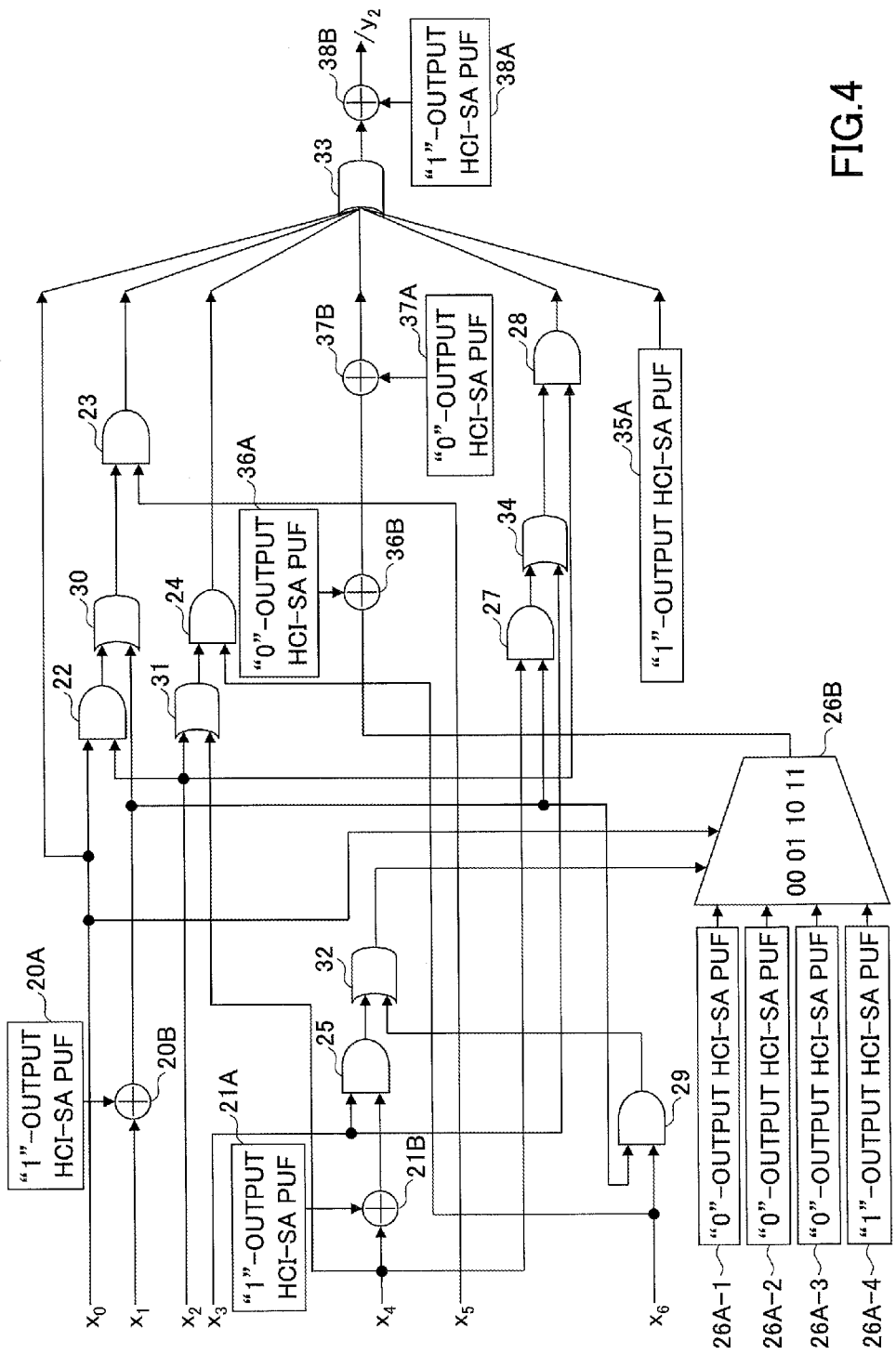
FIG. 4 is a drawing illustrating an example of a circuit that is obtained by incorporating PUF circuits into the circuit illustrated in FIG. 3.

FIG. 4 is a drawing illustrating an example of a circuit that is obtained by incorporating PUF circuits into the circuit illustrated in FIG. 3. In FIG. 4, the same or corresponding elements as those of FIG. 3 are referred to by the same or corresponding numerals, and a description thereof will be omitted as appropriate.

In the circuit illustrated in FIG. 4, the inverter of FIG. 3 is replaced with a PUF circuit 20A and an XOR gate 20B, and the inverter 21 is replaced with a PUF circuit 21A and an XOR gate 21B. Further, the AND gate 26 is replaced with PUF circuits 26A-1 through 26A-4 and a selector circuit 26B. PUF circuits 36A through 38A and XOR gates 36B through 38B are also added and placed in interconnection lines. Moreover, the constant inputting circuit 35 is replaced with a PUF circuit 35A. In the example of the circuit illustrated in FIG. 4, each PUF circuit is an HCI-SA-PUF circuit.

Figure 5:
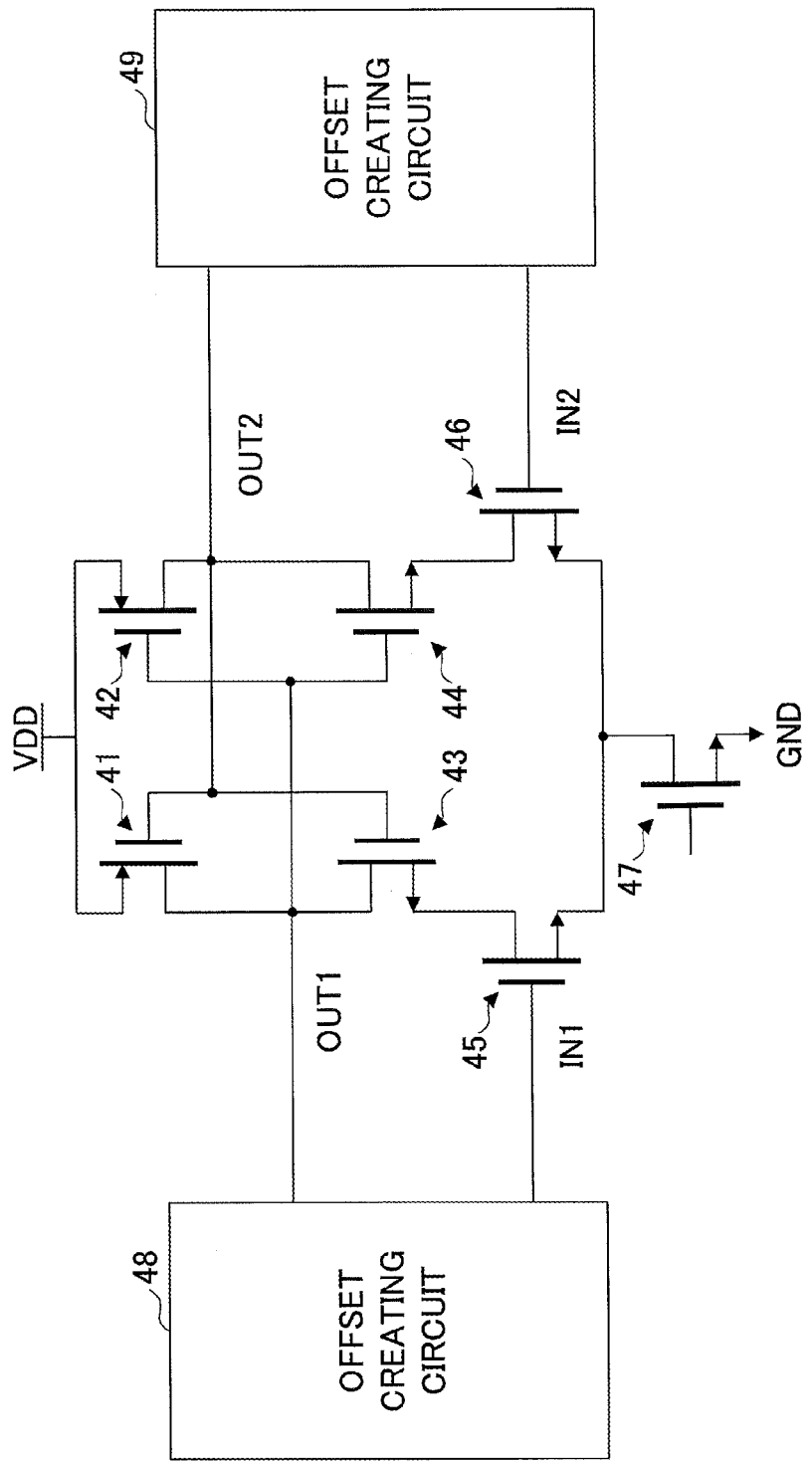
FIG. 5 is a drawing illustrating an example of the configuration of an HCI-SA-PUF circuit.

FIG. 5 is a drawing illustrating an example of the configuration of an HCI-SA-PUF circuit. The HCI-SA-PUF circuit illustrated in FIG. 5 includes PMOS transistors 41 and 42, NMOS transistors 43 through 47, and offset creating circuits 48 and 49. The circuit portion constituted by PMOS transistors 41 and 42 and NMOS transistors 43 through 47 corresponds to a sense amplifier circuit. In the sense amplifier circuit, applying input voltages IN1 and IN2, which are equal to each other, to the gates of the NMOS transistors 45 and 46, respectively, causes different amounts of currents responsive to the respective threshold voltages to flow through the NMOS transistors 45 and 46. The difference in the amount of current is amplified by the latch function of the circuit portion constituted by the PMOS transistors 41 and 42 and the NMOS transistors 43 and 44, resulting in output voltages OUT1 and OUT2 being produced.

The threshold level of the NMOS transistor 45 may be set higher through hot carrier injection than the threshold level of the NMOS transistor 46, for example. In such a case, the output voltages OUT1 and OUT2 are set to HIGH and LOW, respectively. Conversely, the threshold level of the NMOS transistor 46 may be set higher through hot carrier injection than the threshold level of the NMOS transistor 45. In such a case, the output voltages OUT1 and OUT2 are set to LOW and HIGH, respectively.

Hot carrier injection into the NMOS transistor 45 or 46 is performed by use of the offset creating circuits 48 and 49. Specifically, the offset creating circuits 48 and 49 set the drain voltage, the source voltage and the gate voltage of the NMOS transistor 45 to respective, proper voltage levels such that hot carriers are injected into the gate insulating layer of the NMOS transistor 45. Alternatively, the offset creating circuits 48 and 49 set the drain voltage, the source voltage and the gate voltage of the NMOS transistor 46 to respective, proper voltage levels such that hot carriers are injected into the gate insulating layer of the NMOS transistor 46. In general, hot carrier injection occurs in a prominent manner when high voltage is applied to the drain with the gate voltage being smaller than the drain voltage. Especially when the gate voltage is approximately half the drain voltage, hot carrier injection occurs with the maximum intensity.

In this manner, hot carriers are intentionally injected into the gate insulating layer of one of the NMOS transistors 45 and 46, thereby raising the threshold voltage of the transistor. Namely, a difference in threshold voltage is generated between the NMOS transistor 45 and the NMOS transistor 46. Since the output value of the HCI-SA-PUF circuit is responsive to such a difference in threshold voltage, the threshold voltage adjustment as described above enables the output value of the HCI-SA-PUF circuit to be set to a desired value.

Figure 6:
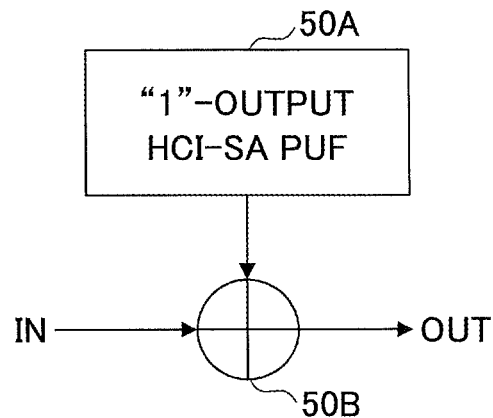
FIG. 6 is a drawing for explaining a first function of a circuit obtained by combining a PUF circuit and an XOR gate.

FIG. 6 is a drawing for explaining a first function of a circuit obtained by combining a PUF circuit and an XOR gate. In FIG. 6, the output of an HCI-SA-PUF circuit 50A is supplied to one input of an XOR gate 50B. Further, an input signal IN from an input node is supplied to the other input of the XOR gate 50B. With this configuration, a circuit is provided that outputs an output signal OUT that is the inverse of the input signal IN. The circuit illustrated in FIG. 6 may be used in place of the inverters 20 and 21 contained in the circuit illustrated in FIG. 3. Analysis by use of a microscope cannot identify the output value of an HCI-SA-PUF circuit. It is thus impossible to determine through external inspection whether or not the circuit portion constituted by the HCI-SA-PUF circuit 20A and the XOR gate 20B illustrated in FIG. 4 is an inverter.

Figure 7:
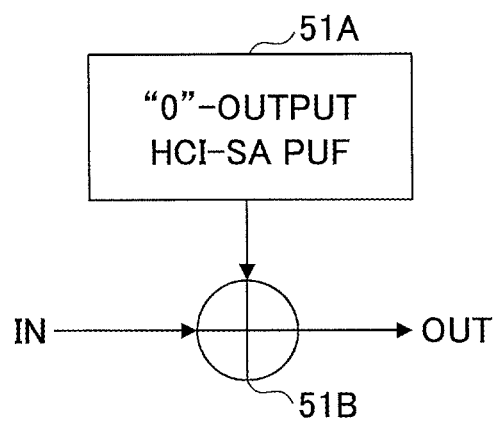
FIG. 7 is a drawing for explaining a second function of the circuit obtained by combining a PUF circuit and an XOR gate.

FIG. 7 is a drawing for explaining a second function of the circuit obtained by combining a PUF circuit and an XOR gate. In FIG. 7, the output of an HCI-SA-PUF circuit 51A is supplied to one input of an XOR gate 51B. Further, an input signal IN from an input node is supplied to the other input of the XOR gate 51B. With this configuration, a circuit is provided that outputs an output signal OUT that is the same as the input signal IN. The circuit illustrated in FIG. 7 may be placed in the interconnection line connected to the output of the AND gate 26 contained in the circuit illustrated in FIG. 3. Analysis by use of a microscope cannot identify the output value of an HCI-SA-PUF circuit. It is thus impossible to determine through external inspection whether or not the circuit portion constituted by the HCI-SA-PUF circuits 36A and 37A and the XOR gates 36B and 37B illustrated in FIG. 4 is equivalent to an interconnection line through which no signal alteration occurs.

Figure 8:
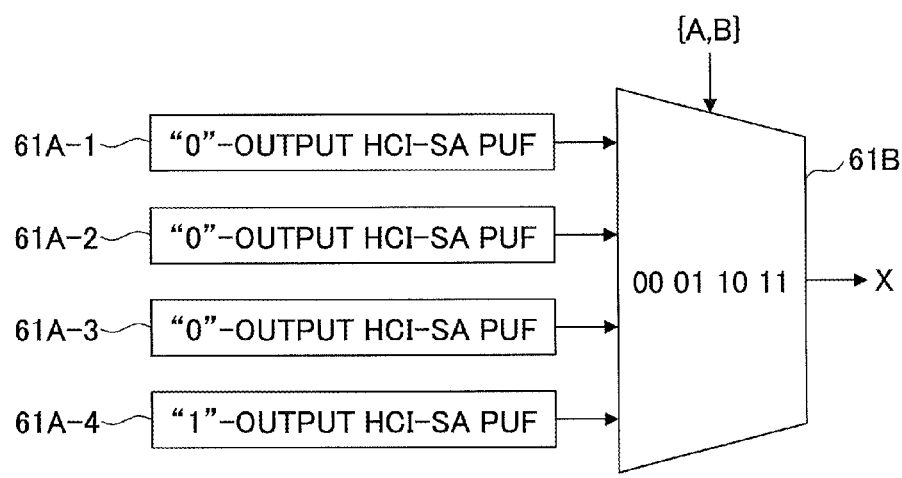
FIG. 8 is a drawing for explaining a function of a circuit obtained by combining PUF circuits and a selector circuit.

FIG. 8 is a drawing for explaining a function of a circuit obtained by combining PUF circuits and a selector circuit. In FIG. 8, the outputs of HCI-SA-PUF circuits 61A-1 through 61A-4 are supplied as inputs to a selector circuit 61B. The selector circuit 61B further receives, as selection control signals, signals A and B each of which is a one-bit signal. The outputs of the HCI-SA-PUF circuits 61A-1, 61A-2, 61A-3, and 61A-4 are 0, 0, 0, and 1, respectively.

In the case of the selection control signals A and B being both "0", the selector circuit 61B selects the "0" output of the HCI-SA-PUF circuit 61A-1 to output "0". In the case of the selection control signals A and B being "0" and "1", respectively, the selector circuit 61B selects the "0" output of the HCI-SA-PUF circuit 61A-2 to output "0". In the case of the selection control signals A and B being "1" and "0", respectively, the selector circuit 61B selects the "0" output of the HCI-SA-PUF circuit 61A-3 to output "0". In the case of the selection control signals A and B being both "1", the selector circuit 61B selects the "1" output of the HCI-SA-PUF circuit 61A-4 to output "1".

The circuit illustrated in FIG. 8 performs an AND operation as described above. It follows that the AND gate 26 contained in the circuit illustrated in FIG. 3 can be replaced with the circuit illustrated in FIG. 8. Analysis by use of a microscope cannot identify the output value of an HCI-SA-PUF circuit. It is thus impossible to determine through external inspection whether or not the circuit portion constituted by the HCI-SA-PUF circuits 26A-1 through 26A-4 and the selector circuit 26B illustrated in FIG. 4 is an AND gate.

Figure 9:
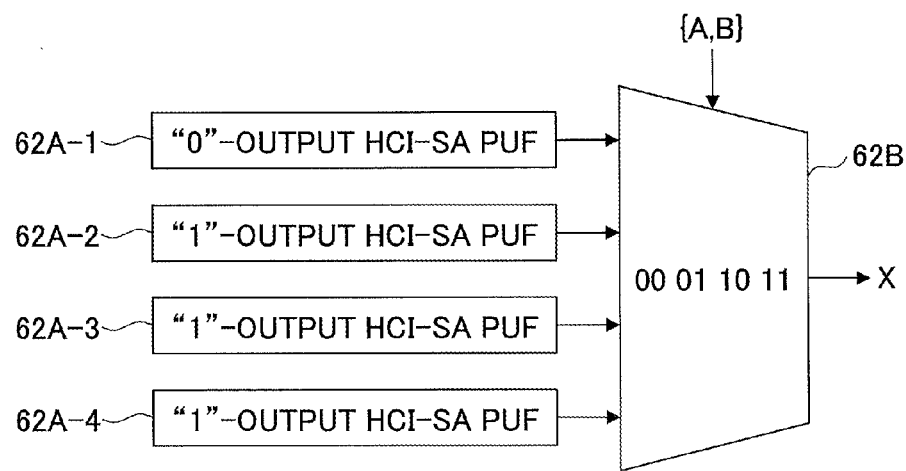
FIG. 9 is a drawing for explaining another function of the circuit obtained by combining PUF circuits and a selector circuit.

FIG. 9 is a drawing for explaining another function of the circuit obtained by combining PUF circuits and a selector circuit. In FIG. 9, the outputs of HCI-SA-PUF circuits 62A-1 through 62A-4 are supplied as inputs to a selector circuit 62B. Further, selection control signals A and B each of which is a one-bit signal are used to determine which one of the outputs of the HCI-SA-PUF circuits is selected by the selector circuit 62B. The outputs of the HCI-SA-PUF circuits 62A-1, 62A-2, 62A-3, and 62A-4 are 0, 1, 1, and 1, respectively. The circuit illustrated in FIG. 9 thus performs an OR operation. One or more OR gates contained in the circuit illustrated in FIG. 3 may be replaced with the circuit illustrated in FIG. 9.

Figure 10:
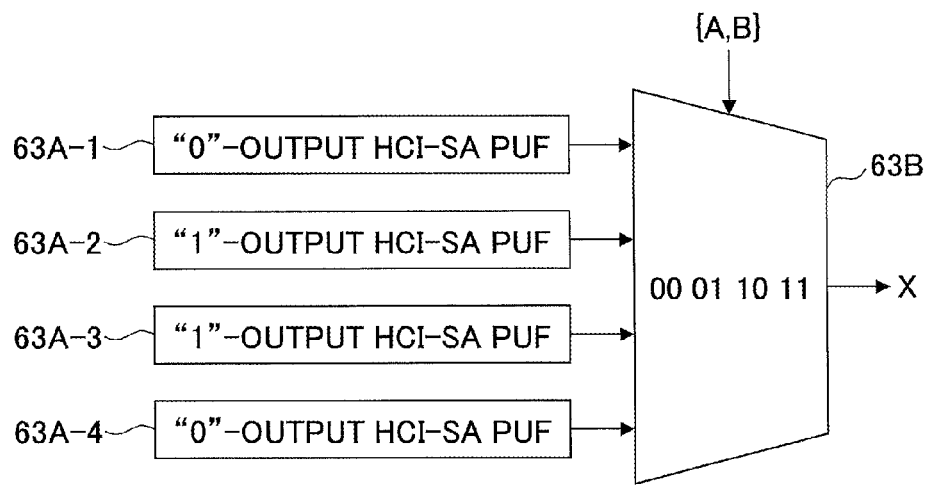
FIG. 10 is a drawing for explaining yet another function of the circuit obtained by combining PUF circuits and a selector circuit.

FIG. 10 is a drawing for explaining yet another function of the circuit obtained by combining PUF circuits and a selector circuit. In FIG. 10, the outputs of HCI-SA-PUF circuits 63A-1 through 63A-4 are supplied as inputs to a selector circuit 63B. Further, selection control signals A and B each of which is a one-bit signal are used to determine which one of the outputs of the HCI-SA-PUF circuits is selected by the selector circuit 63B. The outputs of the HCI-SA-PUF circuits 63A-1, 63A-2, 63A-3, and 63A-4 are 0, 1, 1, and 0, respectively. The circuit illustrated in FIG. 10 thus performs an XOR operation. If an XOR gate is provided in the semiconductor integrated circuit 10 illustrated in FIG. 1, such an XOR gate may be replaced with the circuit illustrated in FIG. 10.

Figure 11:
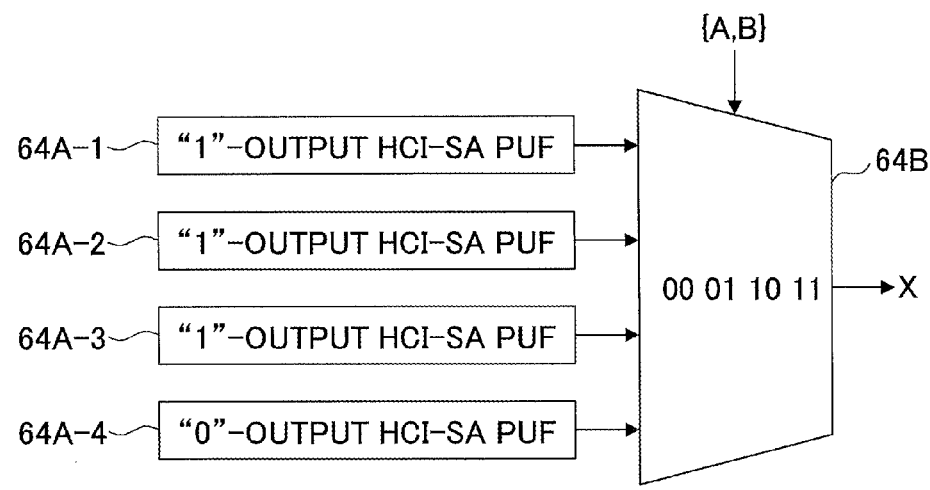
FIG. 11 is a drawing for explaining yet another function of the circuit obtained by combining PUF circuits and a selector circuit.

FIG. 11 is a drawing for explaining yet another function of the circuit obtained by combining PUF circuits and a selector circuit. In FIG. 11, the outputs of HCI-SA-PUF circuits 64A-1 through 64A-4 are supplied as inputs to a selector circuit 64B. Further, selection control signals A and B each of which is a one-bit signal are used to determine which one of the outputs of the HCI-SA-PUF circuits is selected by the selector circuit 64B. The outputs of the HCI-SA-PUF circuits 64A-1, 64A-2, 64A-3, and 64A-4 are 1, 1, 1, and 0, respectively. The circuit illustrated in FIG. 11 thus performs an NAND operation. If a NAND gate is provided in the semiconductor integrated circuit 10 illustrated in FIG. 1, such a NAND gate may be replaced with the circuit illustrated in FIG. 11.

Figure 12:
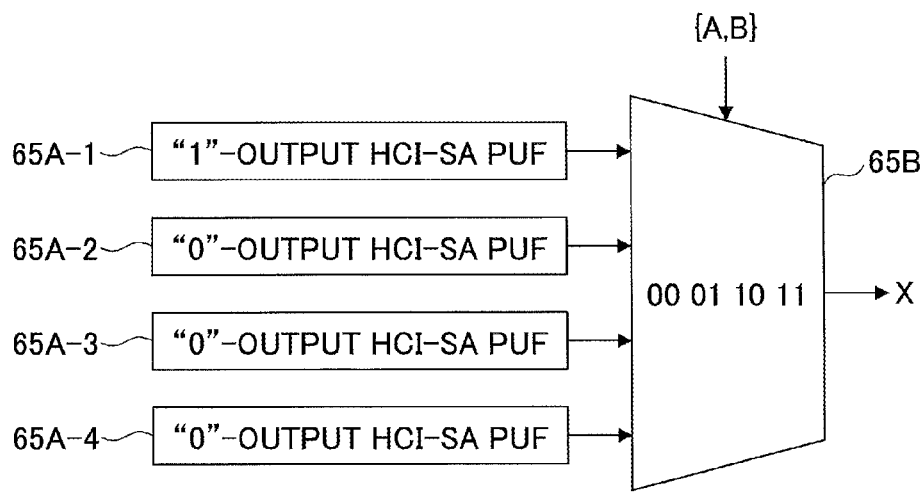
FIG. 12 is a drawing for explaining yet another function of the circuit obtained by combining PUF circuits and a selector circuit.

FIG. 12 is a drawing for explaining yet another function of the circuit obtained by combining PUF circuits and a selector circuit. In FIG. 12, the outputs of HCI-SA-PUF circuits 65A-1 through 65A-4 are supplied as inputs to a selector circuit 65B. Further, selection control signals A and B each of which is a one-bit signal are used to determine which one of the outputs of the HCI-SA-PUF circuits is selected by the selector circuit 65B. The outputs of the HCI-SA-PUF circuits 65A-1, 65A-2, 65A-3, and 65A-4 are 1, 0, 0, and 0, respectively. The circuit illustrated in FIG. 12 thus performs a NOR operation. If a NOR gate is provided in the semiconductor integrated circuit 10 illustrated in FIG. 1, such a NOR gate may be replaced with the circuit illustrated in FIG. 12.

Figure 13:
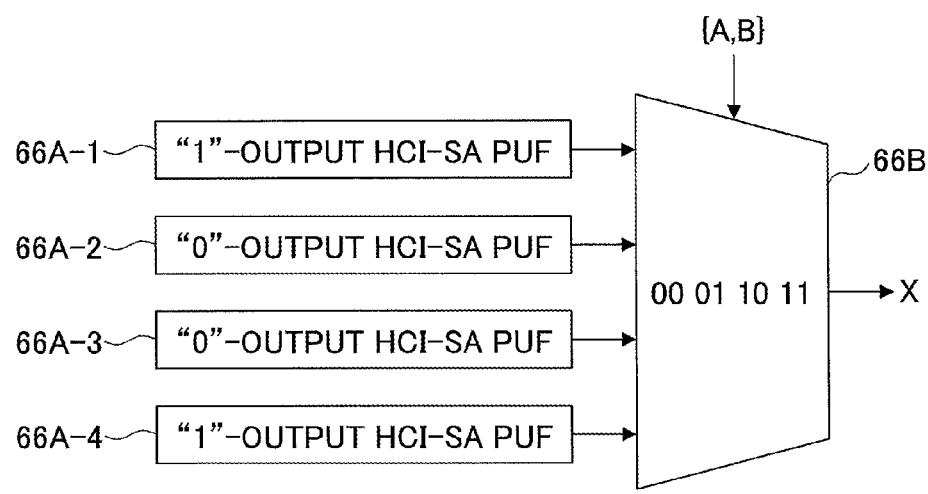
FIG. 13 is a drawing for explaining yet another function of the circuit obtained by combining PUF circuits and a selector circuit.

FIG. 13 is a drawing for explaining yet another function of the circuit obtained by combining PUF circuits and a selector circuit. In FIG. 13, the outputs of HCI-SA-PUF circuits 66A-1 through 66A-4 are supplied as inputs to a selector circuit 66B. Further, selection control signals A and B each of which is a one-bit signal are used to determine which one of the outputs of the HCI-SA-PUF circuits is selected by the selector circuit 66B. The outputs of the HCI-SA-PUF circuits 66A-1, 66A-2, 66A-3, and 66A-4 are 1, 0, 0, and 1, respectively. The circuit illustrated in FIG. 13 thus performs an NXOR operation. If an NXOR gate is provided in the semiconductor integrated circuit 10 illustrated in FIG. 1, such an NXOR gate may be replaced with the circuit illustrated in FIG. 13.

Figure 14:
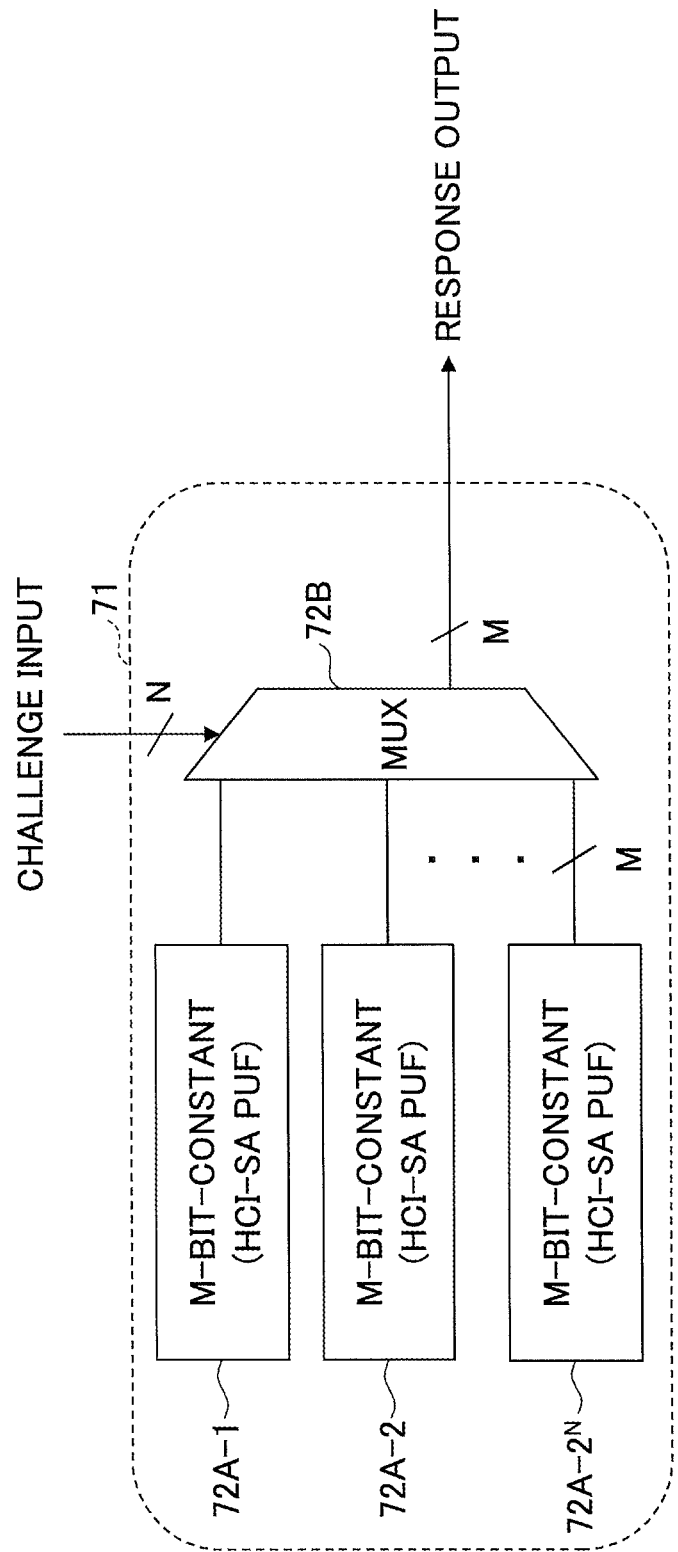
FIG. 14 is a drawing illustrating another example of the configuration of the semiconductor integrated circuit.

FIG. 14 is a drawing illustrating another example of the configuration of the semiconductor integrated circuit 10. In the example illustrated in FIG. 14, the circuit configuration that uses the selector circuit to select one of the outputs of PUF circuits enables the realization of the transformation function of the semiconductor integrated circuit 10 that has an N-bit input and an M-bit output.

The circuit illustrated in FIG. 14 includes $2^N$ M-bit-constant circuits 72A-1 through 72A-$2^N$ and a selector circuit (multiplexer: MUX) 72B. The selector circuit 72B selects one of the $2^N$ M-bit-constant circuits 72A-1 through 72A-$2^N$ in response to the values of N-bit selection control signals, thereby selectively outputting the M-bit output of the selected circuit. The outputs of the M-bit-constant circuits 72A-1 through 72A-$2^N$ are set to desired values, so that the circuit illustrated in FIG. 14 enables the realization of any given transformation function having an N-bit input and an M-bit output. Each of the M-bit-constant circuits 72A-1 through 72A-$2^N$ may use M HCI-SA-PUF circuits to generate M constant output bits.

Figure 15:
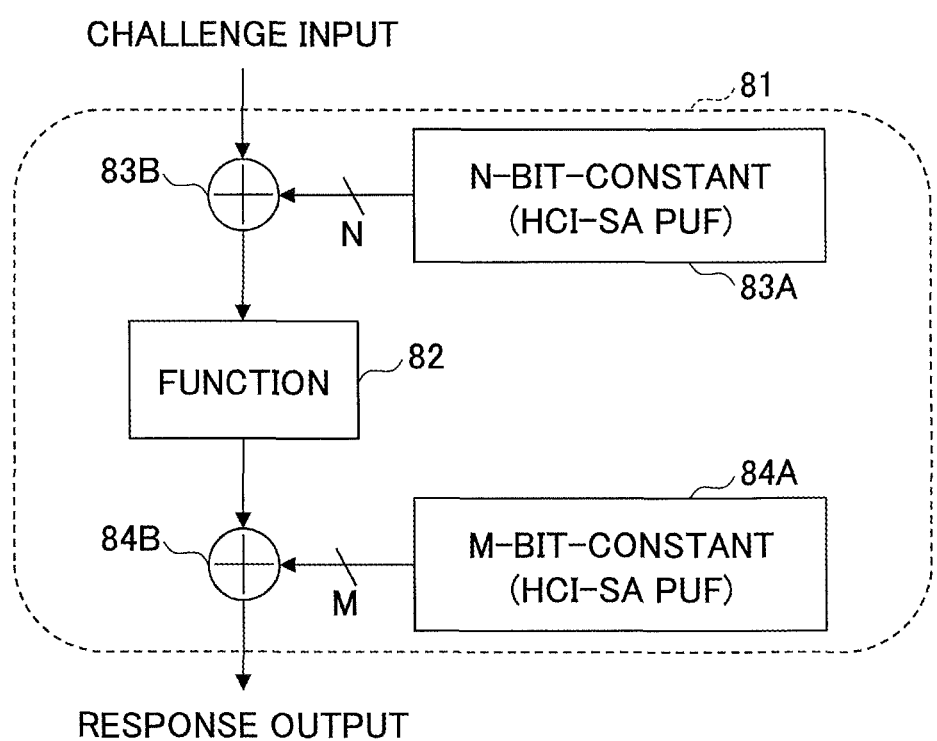
FIG. 15 is a drawing illustrating yet another example of the configuration of the semiconductor integrated circuit.

FIG. 15 is a drawing illustrating yet another example of the configuration of the semiconductor integrated circuit 10.

A circuit 81 illustrated in FIG. 15 includes a function circuit 82 having an N-bit input and an M-bit output, an N-bit-constant circuit 83A, an XOR circuit 83B, an M-bit-constant circuit 84A, and an XOR circuit 84B. The N-bit-constant circuit 83A and the M-bit-constant circuit 84A may use N HCI-SA-PUF circuits and M HCI-SA-PUF circuits to generate N constant output bits and M constant output bits, respectively.

As illustrated in the semiconductor integrated circuit of FIG. 15, the function circuit 82 having an N-bit input and an M-bit output may have an input thereof or an output thereof at least one of which is attached to an XOR gate that performs an XOR operation by use of the outputs of HCI-SA-PUF circuits. This circuit configuration enables the provision of a predetermined function having an N-bit input and an M-bit output. The predetermined function as noted above is not the transformation function realized by the input-and-output relationship of the function circuit 82, but is the input-and-output relationship realized by the entirety of the circuit 81 in which at least one of the input and the output of the function circuit 82 is converted by an XOR gate.

The HCI-SA-PUF circuit 38A and the XOR gate 38B illustrated in FIG. 4 serve to make an alteration by use of an XOR circuit at the output of the function circuit as in the case illustrated in FIG. 15. The constant output of the HCI-SA-PUF circuit 38A is "1". An inverse $/y_2$ of the output $y_2$ of the circuit illustrated in FIG. 3 is thus obtained as the output of the circuit illustrated in FIG. 4. This output $y_2$ is such an output that realizes the intended, desired function. If $y_2$, rather than $/y_2$, is the output that realizes the intended, desired function, the constant output of the PUF circuit 38A is set equal to "0" rather than to "1".

FIG. 3 illustrates the example in which nonlinear transformation function S7 of KASUMI encryption is used with PUF circuits incorporated thereinto as an example of the configuration of an authentication circuit realized by the semiconductor integrated circuit 10. As was previously described, a PUF circuit may be incorporated into the function circuit 16 rather than to an authentication circuit for the purpose of improving anti-counterfeiting security.

Figure 16:
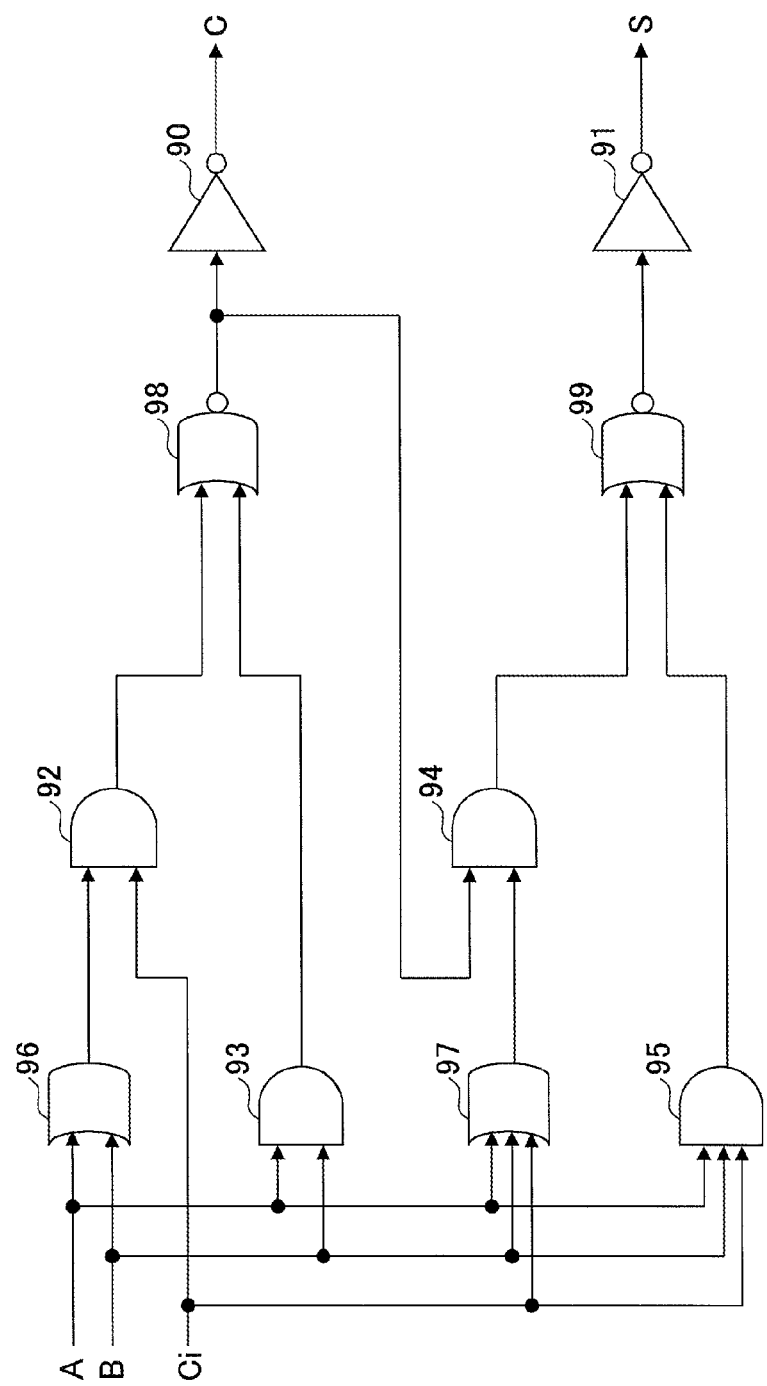
FIG. 16 is a drawing illustrating an example of the configuration of a function circuit.

FIG. 16 is a drawing illustrating an example of the configuration of the function circuit 16. The circuit illustrated in FIG. 16 is a full adder circuit, and includes inverters 90 and 91, AND gates 92 through 95, OR gates 96 and 97, and NOR gates 98 and 99. The full adder circuit adds up an input A, an input B, and a carry Ci to generate a sum S and a carry C.

Figure 17:
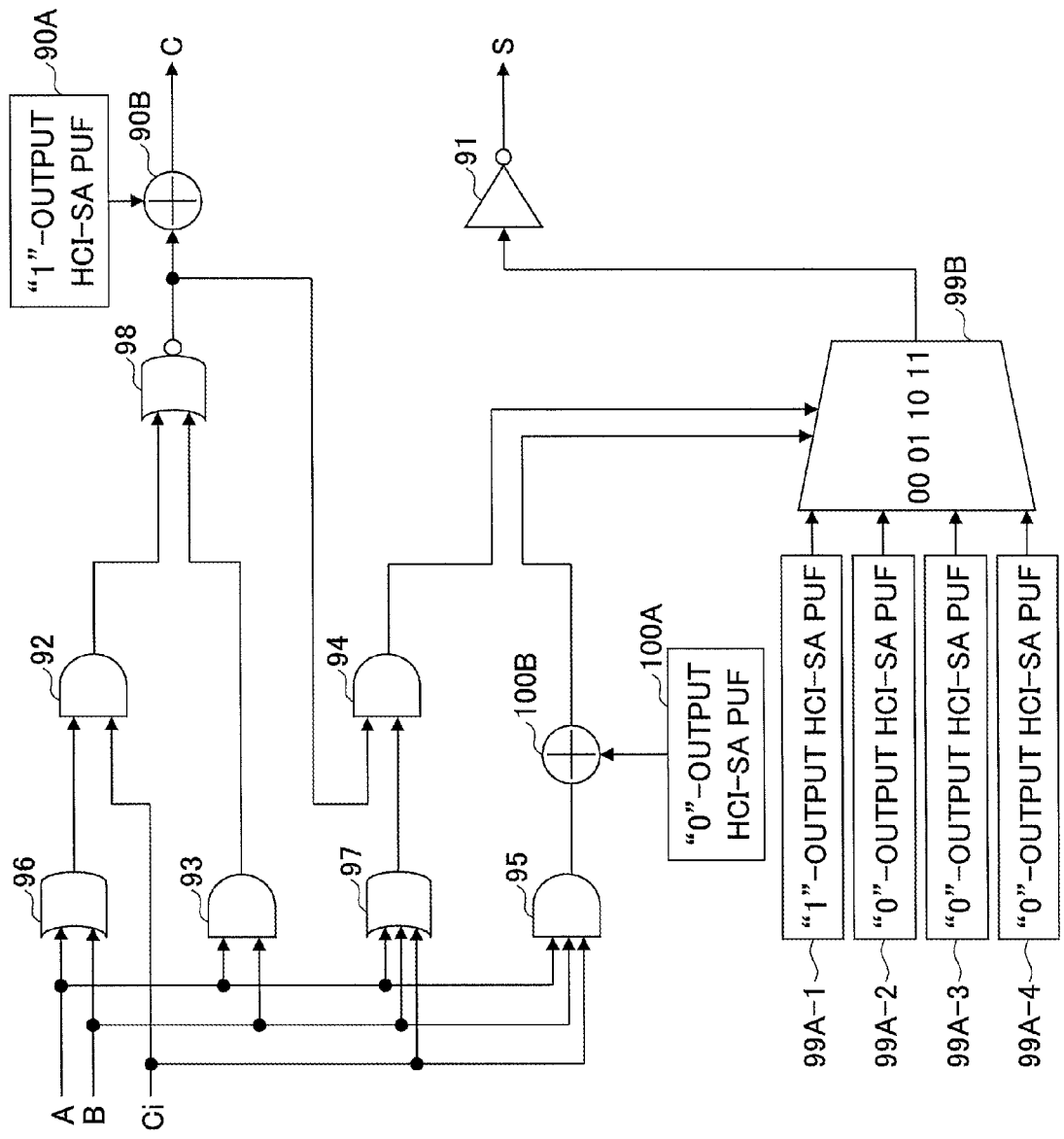
FIG. 17 is a drawing illustrating an example of a circuit that is obtained by incorporating PUF circuits into the circuit illustrated in FIG. 16.

FIG. 17 is a drawing illustrating an example of a circuit that is obtained by incorporating PUF circuits into the circuit illustrated in FIG. 16. In FIG. 17, the same or corresponding elements as those of FIG. 16 are referred to by the same or corresponding numerals, and a description thereof will be omitted as appropriate.

In the circuit illustrated in FIG. 17, the inverter 90 illustrated in FIG. 16 is replaced with a PUF circuit 90A and an XOR gate 90B. Further, the NOR gate 99 is replaced with PUF circuits 99A-1 through 99A-4 and a selector circuit 99B. Moreover, a PUF circuit 100A and an XOR gate 100B are placed in an interconnection line. In FIG. 17, each PUF circuit is an HCI-SA-PUF circuit. Analysis by use of a microscopy cannot identify the output value of an HCI-SA-PUF circuit. It is thus impossible to identify through external inspection what logic operations are performed by the PUF circuits incorporated in the configuration illustrated in FIG. 17. Further, fabricating a dead copy of the circuit structure on an LSI chip based on the analysis utilizing a microscopy ends up causing the logic to be changed, resulting in a failure to counterfeit the product. Accordingly, the full adder circuit that is a function circuit generated by incorporating PUF circuits as illustrated in FIG. 17 is difficult to counterfeit.

In the example illustrated in FIG. 17, a one-bit full adder circuit has been used as an example of a function circuit for the sake of simplicity of explanation. Examples of functions realized by a function circuit include a video and audio processing function, a communication function, various interface functions, an arithmetic function, a data protection (encryption) function, etc. Further, there is no need for the function circuit to be provided on a device with an authentication circuit as illustrated in FIG. 2. The function circuit alone may be provided on a device without an authentication circuit.

Further, the present invention is not limited to these embodiments, but various variations and modifications may be made without departing from the scope of the present invention.

According to at least one embodiment, a semiconductor integrated circuit is provided that utilizes a PUF to effectively and efficiently prevent a counterfeit product from being manufactured, and, also, an authentication system and an authentication method that utilize such a semiconductor integrated circuit are provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. A semiconductor integrated circuit, comprising:
   a first circuit configured to provide a predetermined function; and
   a second circuit that includes a one-bit-output exclusive OR gate and a 1-bit-output sense amplifier circuit configured to utilize hot carrier injection to provide a physically unclonable function,
   wherein the exclusive OR gate is inserted into a signal line extending from a first node of the first circuit to a second node of the first circuit, one input node of the exclusive OR gate being connected to the first node through the signal line, another input node of the exclusive OR gate being connected to an output of the sense amplifier circuit, an output node of the exclusive OR gate being connected to the second node through the signal line, and the output of the sense amplifier circuit is set such that the first circuit provides the predetermined function,
   wherein the second circuit includes transistor devices, and is configured such that the output of the second circuit varies in response to physical characteristic of the transistor devices, the physical characteristics of the transistor devices being either predetermined characteristics to cause the first circuit to provide the predetermined function or different characteristics to prevent the first circuit from providing the predetermined function.

2. The semiconductor integrated circuit as claimed in claim 1, wherein the transistor devices include a transistor device having a threshold value thereof set by hot carrier injection.

3. The semiconductor integrated circuit as claimed in claim 1, wherein the first circuit is configured to generate one or more outputs in response to a plurality of inputs supplied thereto to realize the predetermined function.

4. The semiconductor integrated circuit as claimed in claim 3, wherein transformation from the plurality of inputs to the one or more outputs is defined by a predetermined algorithm, and the output of the sense amplifier circuit is set to realize the predetermined algorithm.

5. The semiconductor integrated circuit as claimed in claim 3, wherein transformation from the plurality of inputs to the one or more outputs is an encryption function, and the output of the sense amplifier circuit is set to realize the encryption function.

6. The semiconductor integrated circuit as claimed in claim 3, wherein transformation from the plurality of inputs to the one or more outputs is a nonlinear transformation circuit for encryption.

7. An authentication system, comprising:
a server having a transformation function stored therein to transform first data to second data; and
a semiconductor integrated circuit configured to communicate with the server,
wherein the semiconductor integrated circuit includes:
a first circuit configured to realize the transformation function; and
a second circuit that includes a one-bit-output exclusive OR gate and a 1-bit-output sense amplifier circuit configured to utilize hot carrier injection to provide a physically unclonable function,
wherein the exclusive OR gate is inserted into a signal line extending from a first node of the first circuit to a second node of the first circuit, one input node of the exclusive OR gate being connected to the first node through the signal line, another input node of the exclusive OR gate being connected to an output of the sense amplifier circuit, an output node of the exclusive OR gate being connected to the second node through the signal line, and the output of the sense amplifier circuit is set such that the first circuit provides the transformation function, and
wherein the second circuit includes transistor devices, and is configured to such that the output of the second circuit varies in response to physical characteristic of the transistor devices, the physical characteristics of the transistor devices being either predetermined characteristics to cause the first circuit to provide the predetermined function or different characteristics to prevent the first circuit from providing the predetermined function.

8. A method for authentication of a target device, the method comprising:
supplying an input into a first circuit included in the target device to utilize the physically unclonable function in causing the first circuit to generate a first output, the target device includes the first circuit and a second circuit, the first circuit being configured to realize a predetermined transformation function, the second circuit including a one-bit-output exclusive OR gate and a 1-bit-output sense amplifier circuit configured to utilize hot carrier injection to provide a physically unclonable function, wherein the exclusive OR gate is inserted into a signal line extending from a first node of the first circuit to a second node of the first circuit, one input node of the exclusive OR gate being connected to the first node through the signal line, another input node of the exclusive OR gate being connected to an output of the sense amplifier circuit, an output node of the exclusive OR gate being connected to the second node through the signal line;
receiving, from the target device, the first output generated by the first circuit in response to the input;
supplying the input to the transformation function provided separately from the first circuit in the target device to cause the transformation function to produce a second output;
comparing the first output with the second output,
accepting the target device as being authenticated upon finding that the first output and the second output are the same; and
rejecting the target device as being not authenticated upon finding that the first output and the second output are different.

* * * * *